(12) United States Patent
Patrick

(10) Patent No.: US 7,823,189 B2
(45) Date of Patent: *Oct. 26, 2010

(54) SYSTEM AND METHOD FOR DYNAMIC ROLE ASSOCIATION

(75) Inventor: Paul B. Patrick, Manchester, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/142,451

(22) Filed: Jun. 19, 2008

(65) Prior Publication Data

US 2008/0256610 A1    Oct. 16, 2008

Related U.S. Application Data

(63) Continuation of application No. 09/878,536, filed on Jun. 11, 2001, now Pat. No. 7,392,546.

(51) Int. Cl.
*H04L 9/00* (2006.01)
*G06F 15/16* (2006.01)

(52) U.S. Cl. .................. 726/2; 726/3; 726/4; 709/217; 709/219

(58) Field of Classification Search .................. None
See application file for complete search history.

(56) References Cited

U.S. PATENT DOCUMENTS

| | | | |
|---|---|---|---|
| 3,748,646 A * | 7/1973 | Schultz et al. | 235/54 F |
| 5,369,702 A | 11/1994 | Shanton | |
| 5,400,248 A * | 3/1995 | Chisholm | 705/12 |
| 5,551,040 A | 8/1996 | Blewett | |
| 5,764,958 A | 6/1998 | Coskun | |
| 5,848,352 A | 12/1998 | Dougherty et al. | |
| 5,872,928 A | 2/1999 | Lewis | |
| 5,911,143 A | 6/1999 | Deinhart | |

(Continued)

FOREIGN PATENT DOCUMENTS

EP    697662 A1    2/1996

OTHER PUBLICATIONS

Ahn, Gail-Joon, et al., "Role-Based Authorization Constraints Specification Using Object Constraint Language," WETICE 2001, pp. 157-162.

(Continued)

*Primary Examiner*—Ponnoreay Pich
(74) *Attorney, Agent, or Firm*—Fliesler Meyer LLP

(57) ABSTRACT

A pluggable architecture allows security and business logic plugins to be inserted into a security service hosted by a server, and to control access to one or more secured resources on that server, on another server within the security domain, or between security domains. The security service may act as a focal point for security enforcement, and access rights determination, and information used or determined within one login process can flow transparently and automatically to other login processes. Entitlements denote what a particular user may or may not do with a particular resource, in a particular context. Entitlements reflect not only the technical aspects of the secure environment (the permit or deny concept), but can be used to represent the business logic or functionality required by the server provider. In this way entitlements bridge the gap between a simple security platform, and a complex business policy platform.

16 Claims, 10 Drawing Sheets

U.S. PATENT DOCUMENTS

| | | | |
|---|---|---|---|
| 5,925,126 A | 7/1999 | Hsieh | |
| 5,969,715 A * | 10/1999 | Dougherty et al. | 725/110 |
| 6,052,531 A | 4/2000 | Waldin | |
| 6,052,723 A * | 4/2000 | Ginn | 709/223 |
| 6,055,637 A | 4/2000 | Hudson | |
| 6,088,679 A | 7/2000 | Barkley | |
| 6,108,699 A | 8/2000 | Moiin | |
| 6,151,599 A | 11/2000 | Shrader et al. | |
| 6,161,139 A | 12/2000 | Win | |
| 6,182,226 B1 | 1/2001 | Reid | |
| 6,202,066 B1 | 3/2001 | Barkley | |
| 6,226,745 B1 | 5/2001 | Wiederhold | |
| 6,243,747 B1 | 6/2001 | Lewis | |
| 6,339,423 B1 | 1/2002 | Sampson | |
| 6,357,010 B1 | 3/2002 | Viets | |
| 6,574,736 B1 | 6/2003 | Andrews | |
| 6,581,054 B1 | 6/2003 | Bogrett | |
| 6,584,454 B1 * | 6/2003 | Hummel et al. | 705/59 |
| 6,606,708 B1 | 8/2003 | Devine et al. | |
| 6,651,249 B2 | 11/2003 | Waldin | |
| 6,735,624 B1 | 5/2004 | Rubin | |
| 6,751,657 B1 | 6/2004 | Zothner | |
| 6,886,100 B2 | 4/2005 | Harrah | |
| 6,957,331 B2 * | 10/2005 | Kursawe et al. | 713/163 |
| 6,978,379 B1 | 12/2005 | Goh | |
| 7,089,584 B1 | 8/2006 | Sharma | |
| 7,093,283 B1 | 8/2006 | Chen | |
| 7,185,192 B1 | 2/2007 | Kahn | |
| 7,185,332 B1 | 2/2007 | Waldin | |
| 7,219,140 B2 | 5/2007 | Marl | |
| 2001/0047485 A1 | 11/2001 | Brown | |
| 2002/0107913 A1 | 8/2002 | Rivera | |
| 2002/0147801 A1 | 10/2002 | Gullotta | |
| 2002/0178119 A1 | 11/2002 | Griffin | |
| 2002/0188869 A1 | 12/2002 | Patrick | |
| 2003/0046576 A1 | 3/2003 | High | |
| 2003/0126236 A1 | 7/2003 | Marl | |
| 2003/0126464 A1 | 7/2003 | McDaniel | |
| 2004/0215650 A1 | 10/2004 | Shaji | |

OTHER PUBLICATIONS

Faden, Glenn, "RBAC in UNIX Administration," ACM Workshop on Role-Based Access Control, 1999, pp. 95-101.

Gustafsson, Mats, et al., Using NFS to Implement Role-based Access Control, WETICE, 1997, pp. 299-304.

Joshi, James, et al., "Security Models for Web-Based Applications," Communications of the ACM, vol. 44, No. 2, Feb. 2001, pp. 38-44.

Na, Sang Yeob, et al., "Role Delegation in Role-Based Access Control," ACM Workshop on Role-Based Access Control, 2000, pp. 39-44.

Oh, Sejong, et al., "Enterprise Model as a Basis of Administration on Role-Based Access Control," CODAS 2001, pp. 150-158.

Park, Joon S., et al., "Role-Based Access Control on the web," ACM Transactions on Information and System Security, vol. 4, No. 1, Feb. 2001, pp. 37-71.

Porwal, Priyank, "Automating Optimistic Access Control Systems," (date unknown), pp. 1-10.

Povey, Dean, "Optimistic Security: A New Access Control Paradigm," 1999.

Sandhu, Ravi S., et al., "The ARBAC97 Model for Role-Based Administration of Roles," ACM Transactions on Information and System Security, vol. 2, No. 1, Feb. 1999, pp. 105-135.

Sandhu, Ravi S., et al., "The RRA97 Model for Role-Based Administration of Role Hierarchies," ACSAC, 1998, pp. 39-49.

Sandhu, Ravi S., et al., "Role-Based Access Control Models," IEEE Computer, vol. 29, No. 2, Feb. 1996, pp. 38-47.

Shim, Won Bo, et al., "Implementing Web Access Control System for the Multiple Web Servers in the Same Domain Using RBAC Concept," ICPADS 2001, pp. 768-773.

Howes, T., "The String Representation of LDAP Search Filters," Netscape Communications Corp., Network Working Group, RFC 2254, Dec. 1997, pp. 1-8.

Hayton, R.J., et al., "Access Control in an Open Distributed Environment," 1998.

Bertino, Elisa, et al., "TRBAC: A Temporal Role-Based Access Control Model," ACM Transactions on Information and System Security, vol. 4, No. 3, Aug. 2001, pp. 191-223.

Covington, Michael J., et al., "Securing Context-Aware Applications Using Environment Roles," ACM Workshop on Role Based Access Control, Proceedings of the Sixth ACM Symposium on Access Control Models and Technologies, 2001.

Yao, Walt, et al., "A Model of OASIS Role-Based Access Control and its Support for Active Security," ACM Workshop on Role Based Access Control, Proceedings of the Sixth ACM Symposium on Access Control Models and Technologies, 2001.

Tzelepi, Sofia K., et al., "A Flexible Content and Context-Based Access Control Model for Multimedia Medical Image Database Systems," International Multimedia Conference, Proceedings of the 2001 Workshop on Multimedia and Security: New Challenges, Oct. 5, 2001.

Goh, Chen, et al., "Towards a More Complete Model of Role," Symposium on Access Control Models and Technologies, Proceedings of the Third ACM Workshop on Role-based Access Control, 1998.

Okamoto, Eiji, "Proposal for Integrated Security Systems," IEEE Computer Society Press, Jun. 1992, pp. 354-358.

http://java.sun.com/products/ejb/ (last visit: Dec. 7, 2004).

http://www.javaworld.com/javaworld/jw-12-2001/jw-1207-yesnoejb_p.html (last visit: Dec. 7, 2004).

http://portal.acm.org/citation.cfm?id=1011463, p. 1, last visited: Oct. 24, 2007.

Koved, et al., "Security challenges for Enterprise Java in an e-business environment," IBM Systems Journal, vol. 40, No. 1, Jan. 2001, pp. 130-152.

Georgiadis, Christos K., et al., "Flexible Team-Based Access Control Using Contexts," ACM Workshop on Role Based Access Control, Proceedings of the Sixth ACM Symposium on Access Control Models and Technologies, 2001.

* cited by examiner

SYSTEM AND METHOD FOR DYNAMIC ROLE ASSOCIATION

CLAIM OF PRIORITY

This application is a continuation of U.S. patent application Ser. No. 09/878,536 entitled "System and Method for Server Security and Entitlement Processing," by Paul B. Patrick, filed Jun. 11, 2001, now U.S. Pat. No. 7,392,546, issued Jun. 24, 2008, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to server security mechanisms, and specifically to an architecture for server security.

BACKGROUND

Over the years the term "security" as applied to server technology, and particularly to e-commerce servers, has expanded to cover several aspects of a secure environment. The original definition of the term has always envisaged a mechanism for validating a particular user's (or client's) identity, and preventing that user from retrieving, viewing, or otherwise accessing, information on the server which they are not allowed to access.

FIG. 1 shows a typical example of a security mechanism commonly used today. Clients 102, 104 access a secured resource such as an application server 106 via a number of protocols; including for example http (hypertext transfer protocol) 110 and IIOP (Internet Inter-ORB protocol) 112. The access requests are filtered through a security layer 108 which determines, typically based on a set of hardwired rules, whether to allow or disallow the requested access. The security layer may be a component of the protected resource (eg. the application server itself) or may operate as a separate entity (for example as part of a firewall system or device).

With current systems little or no attempt is made to analyze the nature of the access request, the type of client, or the type of protected resource. As such, security is often thought of as a simple "permit or deny" mechanism, designed in such a way as to understand the protected resources provided by the server, and to adhere to a predefined set of rules governing a user's or a client's access rights to those resources. There is little or no understanding of the manner in which the request is made, or the environmental setting in which a particular user may make a request to access a resource, and the security mechanism does not lend itself to easy modification of the rules to reflect new changes in business policy regarding security.

Attempts have been made to develop the concept of security and particularly server security to include information that reflects a user's particular environment, and the manner in which a request to access a particular secure resource is phrased. Similarly, attempts have been made to provide security mechanisms that can be easily modified to reflect changes in business policy, security policy, and access rights. These methods still typically require an application programmer to be responsible for assembling a set of business policy queries together and asking the question, "is this OK?—is this access acceptable according to the security rules?" What is needed is a mechanism to make this process all inclusive so that the programmer does not have to understand the business semantics and the business policy rules in order to be able to develop programs and applications that ask security related business policy questions.

Recently, a new set of requirements concerning the securing of resources has emerged from discussions with application server customers and system integrators. These new requirements are expressed in terms of security from the point of view of an application instead of infrastructure. A key differentiation within these new requirements is the existence of business policy enforcement. The enforcement of business policy is typically described in terms of actions that a user is "entitled" to perform based on the role in which they are acting and the context of the business request. Customers and system integrators are frustrated with the fact that they are required to embed code that enforces business policy within applications. Embedding this type of logic creates deployment problems, in that the application must be modified, tested, and re-deployed each time the business policies are changed. Given the rate at which business policy changes, the current requirements for modification and re-deployment are unacceptable.

Customers and system integrators would ideally like to have these new authorization capabilities universally applied across the different types of execution and resource containers, including for example those for Enterprise Java Bean (EJB), Web Applications (Servlet, JSP), as well as other types of business and resource containers. Role-based access control (RBAC) is becoming one of the primary form of authorization requested by customers and system integrators. The trend in use of roles allows organizational identity to be used as an abstract form of identity when making authorization decisions. The use of roles provides a mechanism to reduce both the cost and errors in the administration of application security since it simplifies the amount of administration.

The Java 2 Enterprise Edition (J2EE) defines a declarative form of role-based access control. However, because it is based on a declarative scheme, the association of roles to principals is static. In addition, the current Java 2 Enterprise Edition specification provides no means by which the context of a business request, such as the parameters of the request or the identity of the target, can be taken into account when determining the roles to be associated with a given principal. Consequently, application developers are required to implement business policy rules within the application to compute dynamic roles associations in order to support concepts like "owner."

Customers and system integrators nowadays demand a richer set of authorization capabilities than those provided with the permission-based security defined by Java 2 security and the role-based access control defined in Java 2 Enterprise Edition. The foundation of the requirements for this richer level of authorization can be found in the intersection of classical authorization mechanisms, such as Access Control Lists, and business policy enforcement; and include the ability to take the context of the business request into consideration when making an authorization decision. The request context may include the identity of the target object, the value of the parameter of the request, and potentially environmental information such as the network or IP address of the initiating client.

The lack of a single mechanism through which to integration these new authorization capabilities, regardless of execution or resource container type, is a point of frustration with customers and system integrators. The Service Provider Interface (SPI) is the mechanism used by several application servers, including the WebLogic Server product from BEA Systems, Inc., San Jose, Calif., to allow integration with external authorization providers. This SPI realm has a number of limitations that limit it's ability to be used as a successful means to integrate 3rd-party authorization mechanisms, or new authorization capabilities being required by customers and system integrators.

One of the largest limitations with the current "realm" SPI is scope of enforcement. Currently, the enforcement scope of the realm mechanism does not cover resources such as Enterprise Java Bean and Web Applications. In particular, the realm is focused on RMI style resources such as JMS destinations, entries in JNDI, and servlets at a course-grained level. While the realm could conceivably be updated to hold the definition of the authorization policies required to support protection of such resources, it is the other limitations that ultimately make the realm an unrealistic mechanism to address all the authorization requirements.

The second limitation of the current realm SPI is point of enforcement. The current realm mechanism does not allow the point at which the decision is made to allow access to a protected resource to exist within the realm itself. Instead, the point of enforcement is within the application server itself. Because of this approach, the current realm is defined to support only a permission-based authorization mechanism where the realm simply acts as a database of Access Control Lists. The complexities of providing a Java 2 Policy object that can also support the Java 2 sandbox rules is unacceptable to most vendors.

Yet another limitation is the Enforcement Mechanism Support of the current realm SPI. As with the point of enforcement, the enforcement mechanisms allowed by the current realm SPI are limited to those based on permission-based authorization mechanisms. This is counter to the capabilities of the leading 3rd-party authorization providers, the integration of which is being requested by customers and systems integrators on a daily basis.

Together, these limitations constrain the types of authorization providers that can be integrated with an enterprise application server without minimizing the value proposition of the provider. There remains no current capability to obtain the context of the request in order to provide the rich authorization requested.

JAVA, JAVA TWO ENTERPRISE EDITION (J2EE), and ENTERPRISE JAVABEANS (EJB) are trademarks of Sun Microsystems, Inc. WEBLOGIC is a trademark of BEA Systems, Inc.

SUMMARY OF THE INVENTION

The invention is related generally to server security mechanisms, and specifically to an architecture that provides for server security and entitlement processing. A pluggable architecture allows security and business logic plugins to be inserted into a security service hosted by a server, and to control access to one or more secured resources on that server, on another server within the security domain, or between security domains. The security service may act as a focal point for security enforcement, and access rights determination, and information used or determined within one login process can flow transparently and automatically to other login processes.

The invention also introduces the concept of entitlements that are used within an access context. As used in the context of this application, a "user" or a "client" may refer to the same thing—either a physical person, a hardware device or software application under control of the physical person, or a hardware device or software application operating under autonomous control without user intervention. The user (or client) is the entity which is trying to access a protected resource on the server. This protected resource may, for example, be a software application running on the server, a particular Web page or portion of a Web site, or a database, etc.

When the user attempts to access the resource, the security service may determine the type of access request, the destination (protected resource), and the setting in which the request is made—hereinafter referred to as the access context or simply the context. From this information the security service can determine an "entitlement," or a set of entitlements, for the user. Entitlements clearly denote what a particular user may or may not do with a particular resource, in a particular context. Entitlements reflect not only the technical aspects of the secure environment (the permit or deny concept), but can be used to represent the business logic or functionality required by the server provider. In this way entitlements bridge the gap between a simple security platform, and a complex business policy platform.

To illustrate the capability, consider the following business example: The answer to the question "Can Dr. Smith update a patient's medical chart" is dependent upon the context in which the question is asked. In a permission-based authorization system, this context is absent since the resource is some instance of a 'medical chart' object, the request is to 'update,' and the Subject is 'Dr. Smith.' Consequently, if the answer rendered is 'Yes,' then Dr. Smith could update any patient's medical chart. In a capabilities-based authorization system, it is possible to add the necessary context of who's the patient in question. Thus, the question can now be rephrased as "Can Dr. Smith update Jon Joe's medical chart?" In determining the answer to this question, we now need to know if Dr. Smith is Jon Joe's personal physician, or perhaps an attending physician at a medical center. Using a simple rotation we can represent the concept as follows:

In one embodiment, the invention comprises a security system for allowing a client to access a protected resource, comprising an application interface mechanism for receiving an access request from a client application to access a protected resource, and communicating said access request to a security service; a security service for making a decision to permit or deny said access request; and a resource interface for communicating permitted access requests to said protected resource.

In another embodiment the invention comprises a method of allowing a client to access a protected resource, comprising receiving at an application interface mechanism an access request from a client application to access a protected resource and communicating said access request to a security service; making a decision at said security service to permit or deny said access request; and communicating via a resource interface a permitted access request to said protected resource.

DETAILED DESCRIPTION

Figure 1:
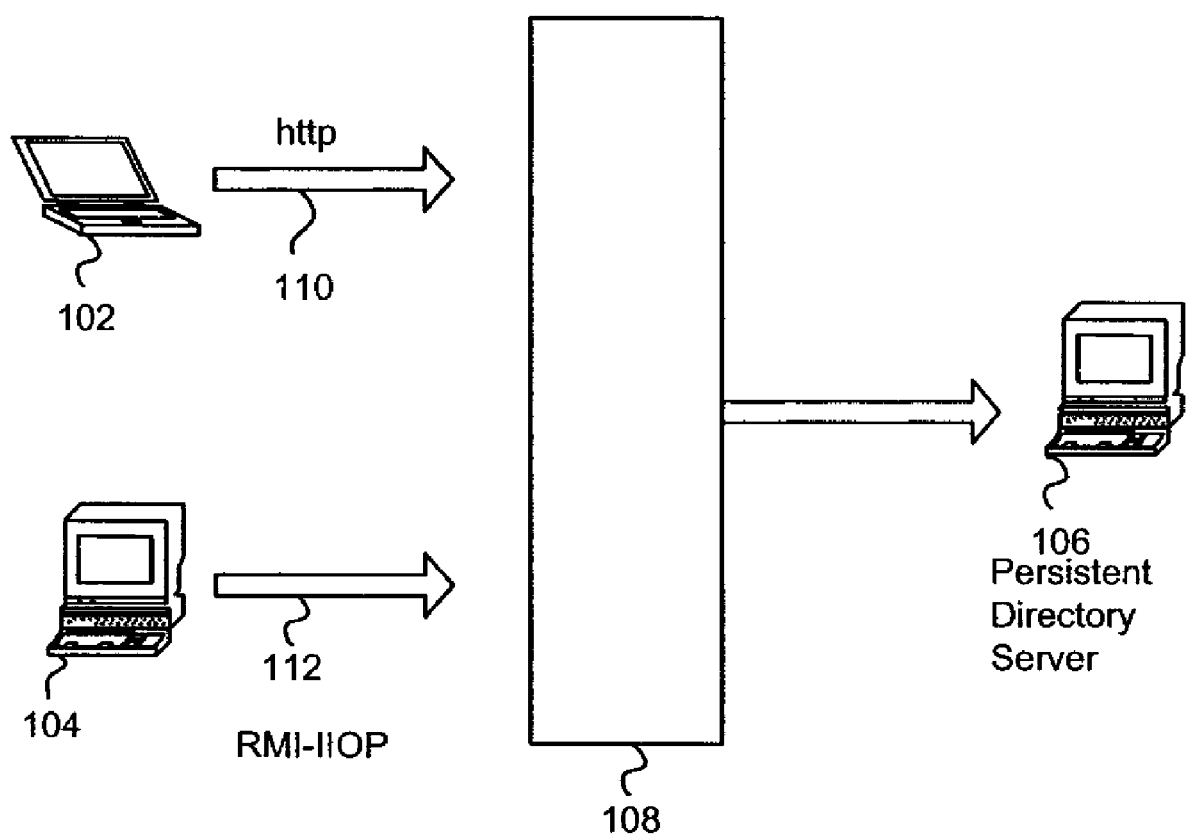
FIG. 1 shows an illustration of a client/server architecture in accordance with the prior art.

An embodiment of the invention includes a security architecture that provides for server security and entitlement processing, that allows security and business logic plugins to be inserted into a security service hosted by a server, and that can be used to control access to one or more secured resources on that server, on another server within the security domain or realm, or between security realms. The security service acts as a focal point for security enforcement and access rights determination, and information used within one login process can flow automatically to other login processes, allowing for single sign or security enforcement.

Except for the new terms that are defined below, the terms used in this document are consistent with terminology as defined in standard texts on Java, Enterprise Java Beans, WebLogic Server, and other generally accepted security concepts.

access control—the restriction of access to resources to prevent its unauthorized use.

access control information (ACI)—information about the initiator of a resource access request, used to make an access control enforcement decision.

access control list (ACL)—the list of entities, together with their access rights, that are authorized to have access to a resource.

authorization—the granting of authority, which includes the granting of access based on access rights.

credentials—information describing the security attributes (identity and/or privileges) of a user or other principal. Credentials are claimed through authentication or delegation, and used by access control.

delegation—the act whereby one user or principal authorizes another to use his (or hers or its) identity or privileges, perhaps with restrictions.

entitlement—a right or permission granted to a principal.

identity—a security attribute with the property of uniqueness; no two principals' identity may be identical. Principals may have several different kinds of identities, each unique.

principal—a user or programmatic entity with the ability to use the resources of a system.

role—an organizational identity that defines a set of allowable actions for an authorized user.

Role Based Access Control (RBAC)—a class of security mechanisms that mediate access to resources though organizational identities called roles.

security attributes—characteristics of a subject (user or principal) that form the basis of the system's policies governing that subject.

security policy—the data that defines what protection a system's security services must provide. There are many kinds of security policy, including access control policy, audit policy, etc.

Service Provider Interface (SPI)—a package or set of packages that support a concrete implementation of a subset of services.

target—the final recipient in a delegation "call chain." The only participant in a call-chain that is not an originator of a call.

target object—the recipient of a business request message.

trust model—a description of which components of the system and which entities outside the system must be trusted, and what they must be trusted for, if the system is to remain secure.

Trusted Computing Base (TCB)—the portion of a system that must function correctly in order for the system to remain secure. A TCB should preferably be tamper-proof and its enforcement of policy should not be able to be circumvented.

unauthenticated principal—a user or other principal who has not authenticated any identity or privilege.

user—a human being using the system to issue requests to objects in order to get them to perform functions in the system on their behalf Embodiments of the invention described herein allow for the determination of entitlements as used within an access context. Typically, a user is trying to access a protected resource on the server. This protected resource may, for example, be a software application running on the server, a particular Web page or portion of a Web site, or a database system. Other types of protected resource may be used while remaining within the spirit and scope of the invention. When the user attempts to access the resource, the security service determines the type of access request, the destination (the protected resource), and the context in which the request is made. From this information the security service can determine an entitlement, or a set of entitlements, for the user. Entitlements clearly denote what a particular user may do with a particular resource in a particular context. Entitlements can be used to represent the business logic or functionality required by the server provider, thus bridging the gap between a simple security platform, and a complex business policy platform.

Embodiments of the invention additionally allow for the integration of third party vendor security products to provide protection for such application types as:

Enterprise Java Beans

Web Applications (Servlets, Java Server Pages (JSP's))

Resources (Remote Method Invocation (RMI), Java Messaging System (JMS))

Embodiments of the invention also allow for the integration of external public key infrastructure to support such advanced features as:

Certificate and key retrieval

Certificate validation

Revocation mechanisms (Certificate Revolution List (CRL), Online Certificate Status Protocol (OCSP)).

An important goal in developing the invention is to include support for the Java 2 Enterprise Edition (J2EE) specification and interoperability therewith. These J2EE specification features include the Common Secure Interoperability (CSI) protocol, user identity tokens, the Stateless Authentication Service (SAS) protocol, support for propagation of security credentials across machine, cluster, and/or domain boundaries, control of propagation of identity based on policy, enhanced support for virtual host/sites, the ability to generate a user identity scoped to domain, and host/site specific security policies.

Another important goal of the invention is to include support for features such as updated SSL capabilities, hardware accelerators, Transport Level Security (TLS) protocol, session resumption, certificate authorities, protection of network connections, Web server proxy, server to server communications, encryption of session ID, and enhanced integration with directory servers.

Security Domains

As used in the context of the invention, a security realm or domain can span a single server, a plurality of servers, a cluster of servers, or a management domain. The invention allows for administrative control of identity propagation within, across, and between security domains. The identity of a client application or user can be propagated and scoped by the security domain. For example:
Principal-Identity@security-domain-name When propagation is disabled, the initiating identity can be represented as being anonymous. For example:
<anonymous>@initiating-security-domain-name Framework The security architecture or framework provided by the invention is intended to address the requirements put forth and many other things. Focusing exclusively on the authorization requirements, the security architecture attempts to provide the following capabilities in addition to a typical permission-based authorization:

Dynamic Role Association

Dynamic Role Association is a mechanism to allow a late binding of the association of roles to principals, that is capable of taking the context of the request into consideration during the determination of the roles for which the principal is entitled. Dynamic Role Association can be thought of as the late binding of principals to roles at runtime. This late binding occurs just prior to an authorization decision for a protected resource regardless of whether the principal-to-role association is statically defined or dynamically computed. Because of its placement in the invocation sequence, the result of any principal-to-role associations can be taken as identity as part of any authorization decision made as part of this request.

Unlike statically defined associations, the association of principals to roles can be computed dynamically at runtime. The computation of a dynamic role is able to access a number of pieces of information that make up the context of the request, including the identity of the target (if available), the values of the request's parameters, the values of profile attributes associated with the initiating principal, as well as potentially other information.

The context information is typically utilized as values of parameters in an expression that is to be evaluated by a rules or expression evaluation engine. Depending upon the functionality provided by the evaluation engine, it may also be possible to express the ability to call out to an external class that performs external calculations, such as the amount of miles flown by the principal, that are then used as parameter of the expression.

In addition to computing any roles that should be dynamically associated with the principals in the Subject, this same functionality is also responsible for associating any roles that were statically defined either through the consumption of a J2EE defined Deployment Descriptor or by an administrator.

The result of this capability is in one embodiment, an updated JAAS Subject that contains any roles that the principals contained in the Subject were entitled to receive given the context and the target. These roles are then available to any authorization decisions on protected resources, as well as business container and application code. For example, a personalization server, application server, or Web server, could utilize standard methods to determine if a particular role is held by the subject as a means to personalize a web page. This same mechanism could be used by an Enterprise Java Bean or other application to determine whether to retrieve certain fields from a record in a database, without having knowledge of the business policies that determine whether access should be allowed, resulting in field-level authorization.

Parametric Authorization

Parametric Authorization is a mechanism that allows an authorization decision about a protected resource to be determined that is potentially based on the context of the request. Within the architecture provided by the invention, the scope of enforcement has been broadened to apply to all execution and resource containers. This is accomplished by having all execution and resource containers obtain authorization and role mapping services through an AccessController object provided by a Security Service. The AccessController utilizes the authorization services provided through the Service Provider Interfaces in order to provide the requested capabilities.

The Service Provider Interfaces that actually define the mechanisms used to provide Dynamic Role Association and Parametric Authorization are based on a delegated authorization design that results in the point of enforcement being moved to the provider of the functionality, instead of within the application server itself.

In addition, the methods defined on the Service Provider Interfaces that comprise the authorization framework utilize an enforcement mechanism designed to support a capabilities-based authorization mechanism that more naturally aligns with the services provided by 3rd-party authorization vendors. The use of a capabilities based mechanism allows the delegated authorization approach to support both capabilities-based as well as permission-based implementations.

Traditional security mechanisms tend to be context-less since they are based solely on permissions granted a principal for a given resource. Therefore, the only types of authorization decisions that can be made are whether the principal has the necessary permissions to access the resource. These types of authorization decisions are more complicated since they don't tend to represent business decisions. As a result, additional security checks are often required in application code to compensate for this limitation. For example, using traditional methods one could evaluate whether a principal is allowed to transfer money to a specific account. However, it is not possible to take into account the amount of the transfer, the currency of both the source and destination accounts, and the day of the week.

In a parametric authorization based mechanism in accordance with the invention, the authorization decision is made using the context of the request, therefore the authorization decision more closely represent real business decisions. There is very little need for compensating security checks in the application itself For example, using the invention in a real-world banking example it is possible for the authorization decision to take into consideration the amount of the transfer, the currency of both source and destination accounts, and the day of the week as part of processing the business policy that controls whether transfers are allowed, by whom, and under what circumstances.

Access to Context Information

While some other systems have tried to provide capabilities similar to the description of parametric authorization described above, these earlier systems and methods all require the caller to have previous knowledge of the parameters of the business policy being evaluated. The requirement for this knowledge presents virtually the same issue as that with making the authorization decision in application code-knowledge of some aspect of the business policies. Any time the business policy changes to require another piece of context information, the application must be modified and re-deployed.

Addressing the issue of providing context information without prior knowledge of the business policy is accomplished by using callbacks to the containers from the authorization provider. While changing the type or number of parameters of a request fundamentally changes the application requires the application be re-deployed, it is possible for the implementations of dynamic role association and parametric authorization providers to obtain access to the context information without requiring the application to have prior knowledge of aspects of the business policies.

The Service Provider Interfaces defined to work with the invention and support the authorization framework can utilize a standardized callback mechanism similar to the one defined in the Java Authentication and Authorization Service (JAAS). Utilizing a callback handler that is passed from the container to the implementation of the Service Provider Interfaces, the provider is capable of requesting specific context information be returned. When the container's callback handler is called, the container responds by populating the callbacks with the appropriate values. If the container does not understand the callback specified in the handler, it does not update the callback with a value. Neither the application, nor the container is aware of changes to business policy since they are queried for context information that is driven by the evaluation of specific business policy expressions.

Functional Description

Implementations of an entitlement processing engine (entitlement engine) that could be used to satisfy the requirements of parametric authorization must support the following requirements:

An implementation should be able to specify that the value of a parameter from the business request, primary key, attribute from a Principal contained in the JAAS Subject that represents an authenticated user, and any potentially other information considered part of the context be expressed as part of a rule expression.

An implementation should be able to request parametric information from the caller on-demand, instead of requiring any parametric information that could be potentially used by the evaluation of rules to be passed at the beginning of rule evaluation. The mechanism for requesting information should be in the form of a callback similar to that defined for JAAS. The implementation might callback for each piece of information individually, request multiple pieces of information in a single callback, or a combination of both.

An implementation should be able to specify the name of a Java class that will be called as part of the evaluation of a rule. The value returned from the Java class will be used in the evaluation of the rule expression. This can be thought of as a macro facility where user provided code is called to compute a value that is then taken into consideration when evaluating the rule. For example in a travel booking example, a rule expression could specify a call to a user-supplied class that computes or looks up the number of miles a passenger represented by the Subject has flown to date.

The evaluating of a set of rules should result in a boolean value that indicates whether the rule was successfully satisfied or not.

The invention provides enterprise application developers with a framework architecture within which application implementations, particularly login, authorization, and auditing implementations, may be deployed or "plugged in" to allow the development of readily adaptable and customizable business functions and scenarios. These systems can serve to interpret the principal identity in the context of a particular scenario, and to tailor business functions to meet the interpreted identity.

The framework architecture provided by the invention particularly allows Java developers to make use of existing Java security features, but to greatly expand the use of these security features in a manner that is transparent to the developer (or the user), and that can allow the security provided to be distributed throughout the enterprise without a need for additional layering or translation of security processes.

Embodiments of the invention are particularly useful in the field of enterprise and server security and business workflow. Since the framework uses a pluggable architecture, it allows third-party vendors to provide security implementation plug-ins without a need for the core architecture to be modified. These plug-ins may include tools for digital certificate and key retrieval, certificate validation, and revocation mechanisms (e.g. CRL and OCSP). The pluggable framework architecture thus allows for the secure access control of enterprise resources, such as enterprise Java beans (EJB's), applications (including servlets and JSP's), and other networked resources (such as RMI, JNDI, and JMS destinations).

Additionally, the framework architecture of the invention is especially suited to providing a method of secure authorization and secure resource access throughout an enterprise-wide security domain. Each server with a domain may provide a different set of features, services and applications. The invention allows developers to deploy client applications which can make use of each server's particular services through a single sign-on mechanism that determines the client's access privileges throughout the domain or between cooperating domains.

Figure 2:
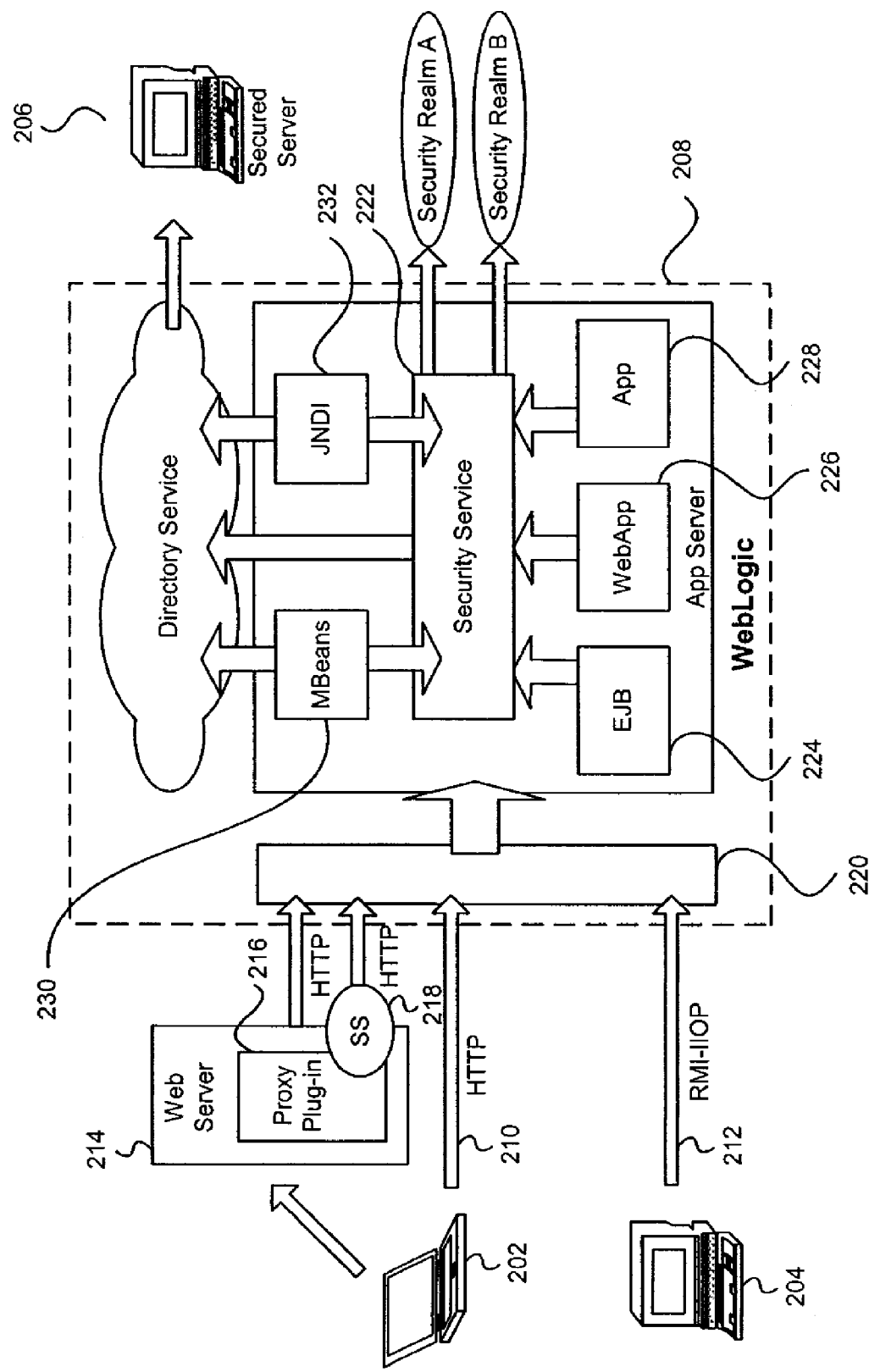
FIG. 2 shows an illustration of a client/server architecture in accordance with the invention.

FIG. 2 shows an example of a security architecture in accordance with an embodiment of the invention. As shown therein, clients 202, 204 (which may be either physical hardware clients or software applications) may attempt to access a secured service or resource 206, such as a persistent directory server, via a transaction or application server 208. An example of such a transaction server is the Weblogic Server product from BEA Systems Inc., San Jose, Calif., although the invention may be used with any other server product or equivalent system. Internet CORBA clients will typically attempt to make such an access through an Internet Inter-ORB Protocol (IIOP) request 212. Web clients will typically attempt to make an access through a series of hypertext transfer protocol (http) requests 210, either directly via a Web server 214, or via a proxy plug-in 216 (in which case the proxy may also provide additional functionality, such as, for example, secure socket layer (SSL) encryption 218). In any case, the connection attempt is received by the transaction server, often via an initial connection filter 220, and is passed to the security service 222. In accordance with the invention, the security service 222 is the focal point for security determination, including client and user level resource access, authorization, certification, privilege assessment and entitlement determination. Enterprise Java Beans (EJB's) 224, Web applications (WebApp's) 226, and other forms of applications may all use the security service through the use of containers. The security service handles calls from these containers to the protected resource, which in the case of FIG. 2. The calls may be handled by, for example, a plurality of managed beans (MBeans) 230, or the Java Named Directory Interface (JNDI) 232.

Figure 3:
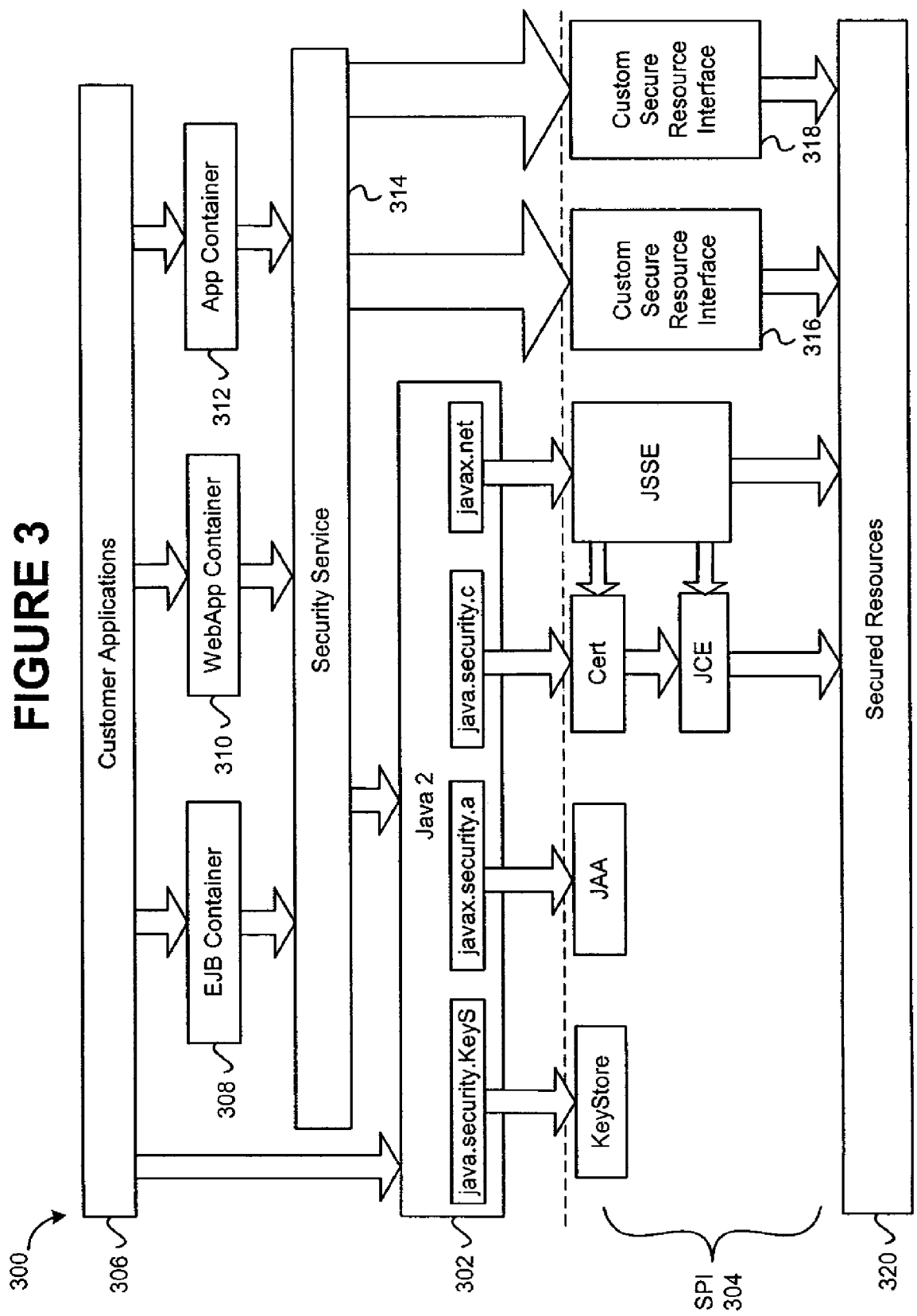
FIG. 3 shows an illustration of a security service in accordance with the invention.

FIG. 3 illustrates an embodiment of the security service architecture 300 in greater detail. The security service augments the basic security services and features provided by the standard Java2 Enterprise Edition security set. As shown in this example, the basic Java security set 302 includes security provider interfaces 304 for key storage, authentication, certificate validation, and secure sockets, among others. Customer applications 306 may be written to directly take advantage of the Java security layer and these SPI's. The invention, as shown in FIG. 3 greatly enhances the developer's options in making use of these and other security features. In accordance with the invention, customer applications are deployed in containers, for example, an EJB container 308 of a WebApp container 310. The containers communicate directly with the security service 314 (herein the same as security service 222), which in turn communicates with the Java security layer 302 and its security SPI's 304. This allows the responsibility for secure authorization decisions to be moved from the application and placed in the security service layer.

In addition, the invention is ideally suited to integrating the use of preexisting Java security SPI's 304 with custom SPI's 316, 318. Additional SPI's such as, for example, a connection filter, an access decision interface, an audit channel, and a certificate authenticator, may be included or integrated with the security server. The security service mediates access to the entire range of secured enterprise resources.

Figure 4:
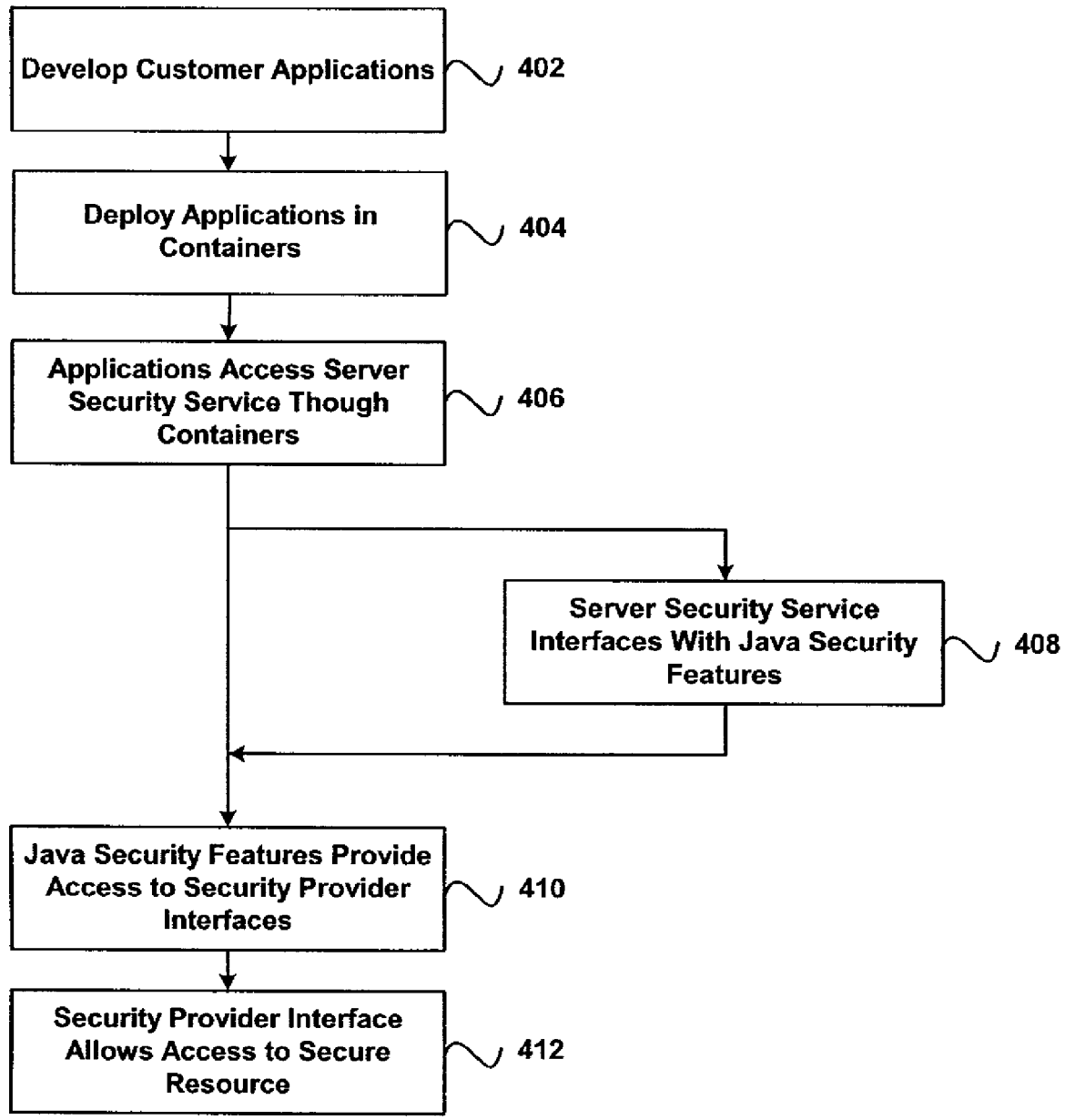
FIG. 4 shows a flowchart of a method used by the security service in accordance with the invention.

FIG. 4 illustrates a process by which an application may use the invention to access a secure resource. In step 402, a developer creates a customer application. The application may be one used by a physical user or customer, or may be an application interface program to allow another application to make use of the security server. In step 404, the application is deployed within a container, the deployment process of which is disclosed in further detail below. The application then, in step 406, accesses the security service using this container. Optionally, in step 408, the security service can interface directly with a set of J2EE compliant Java security features. Alternatively, in step 410, the containers are used to allow access to a third-party or custom Security Provider Interface. In step 412, the Security Provider Interface allows the application to access the secure resource, provided that the security service has indicated that the access requested should be allowed.

Figure 5:
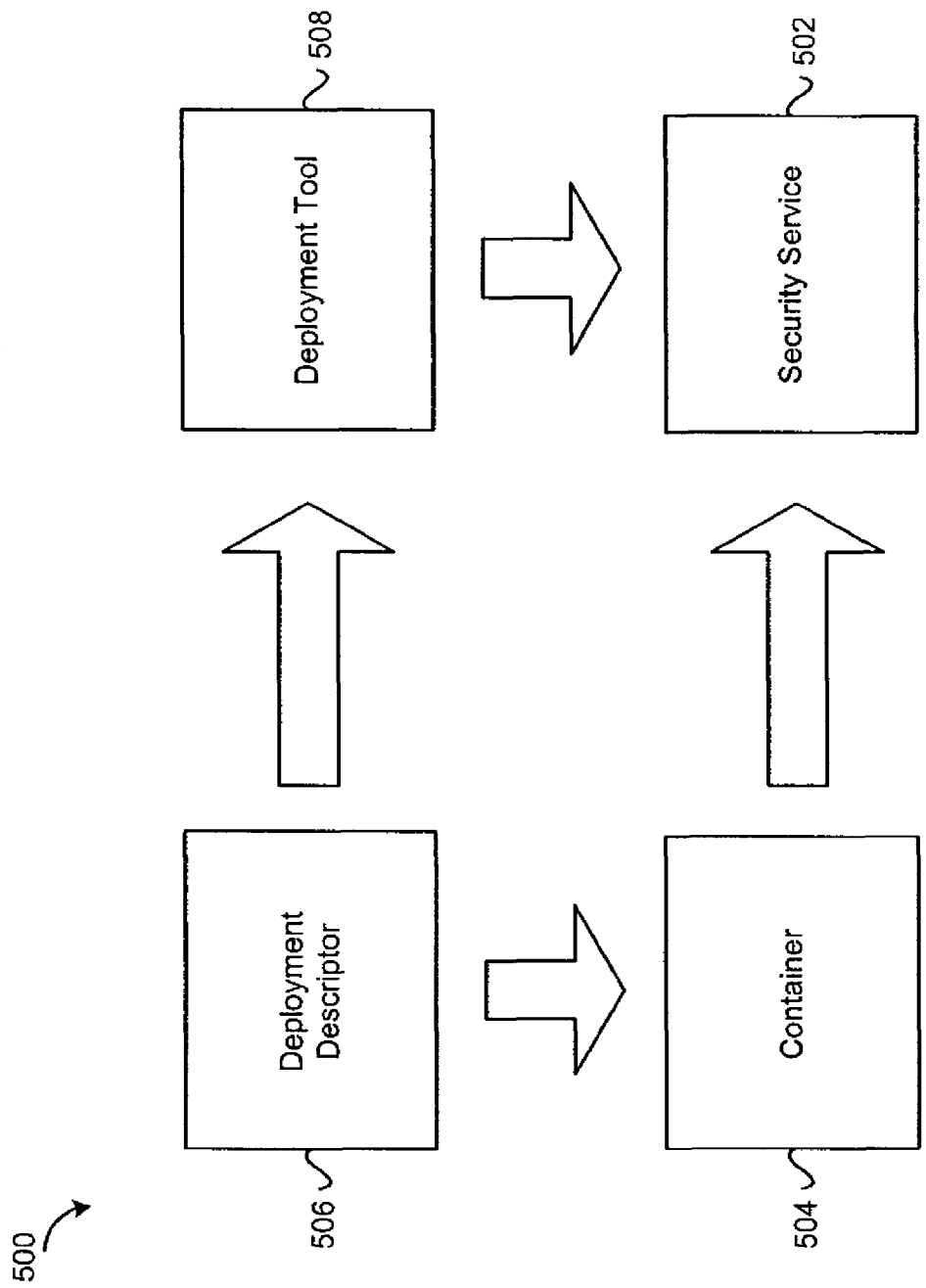
FIG. 5 shows an illustration of a server security deployment tool and process in accordance with the invention.

FIG. 5 illustrates one embodiment of the deployment mechanism used to deploy an application within a container. As shown in FIG. 5, data is registered in the security service 502 (herein the same as security service 314) for use by the application container 504. Traditionally, the container reads the information from the deployment description 506, and the actual container then does the enforcement. If there are different kinds of containers, one for WebApp, one for EJB, then there would need to be different implementation engines. In addition there exists a series of resources inside of the J2EE environment that do not have a container, and that don't have deployment descriptors. The primary problem with this method is that various aspects of security are enforced in different ways within a single environment. The invention addresses this problem by first allowing the container reading the deployment descriptor to inform the security service of the security constraints and policies defined within, resulting in the population of security policies within the security service. Secondly, the container delegates all authorization decisions to the security service when the container later makes a request to access a protected resource, thus moving the point of enforcement from the container to the security service. The authorization decision is made by consulting the security constraints and policies provided through the deployment description, as well as any defined by the administrator through an administrative tool. A deployment tool can also be used to read the deployment descriptor and record the security information contained within into the security service. The deployment tool can then go directly to the security service, without reading the deployment descriptor.

Figure 6:
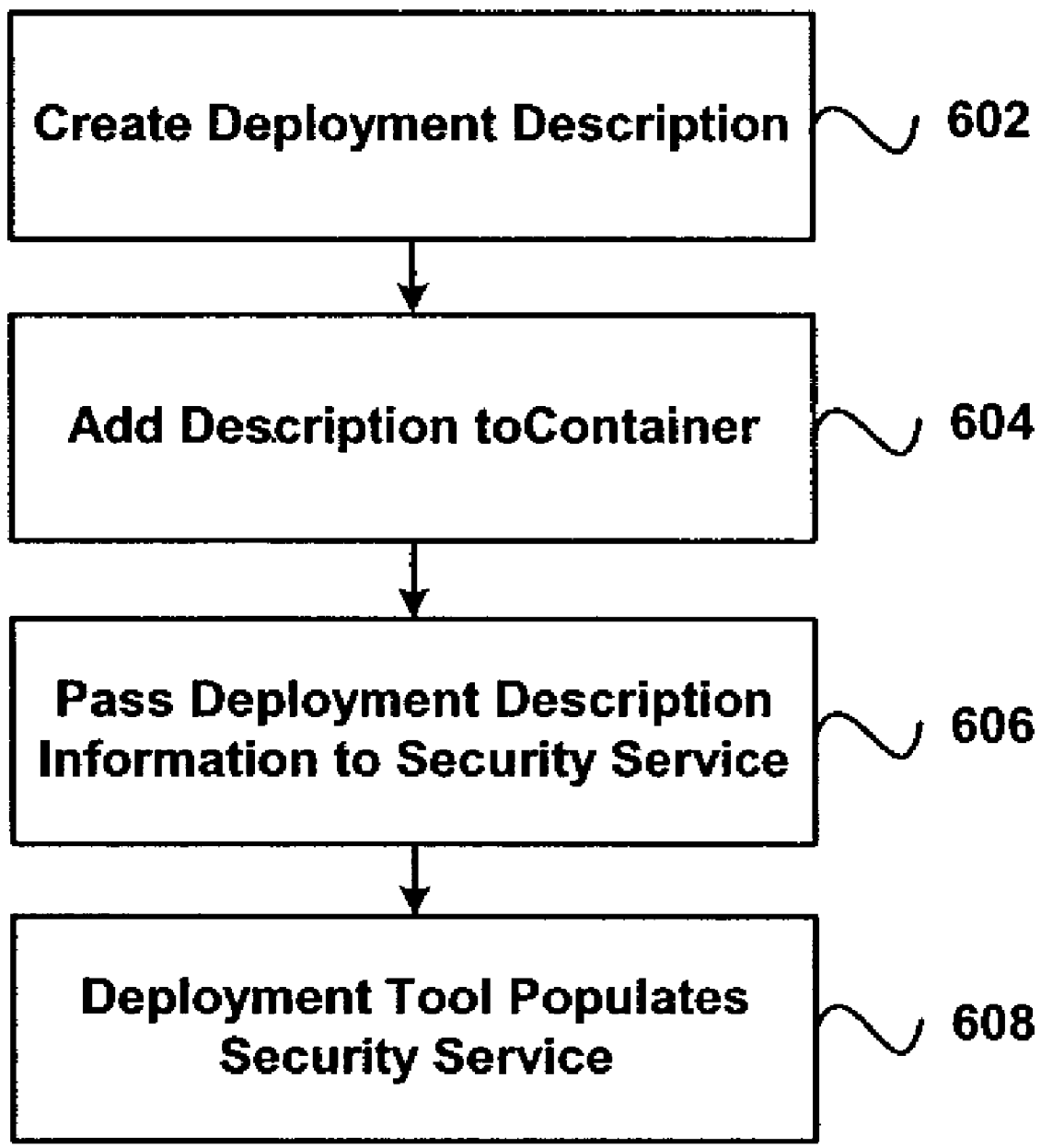
FIG. 6 shows a flowchart of a method used by the server security deployment tool in accordance with the invention.

FIG. 6 illustrates a process by which data is entered into the security service during application deployment. In step 602, the developer creates a deployment description. The description is passed to the container in step 604, where the container analyzes the information to assess what information should be passed to the security service. Optionally, the deployment description could be given to a deployment tool, in step 606, that passes the information to the security service.

Figure 7:
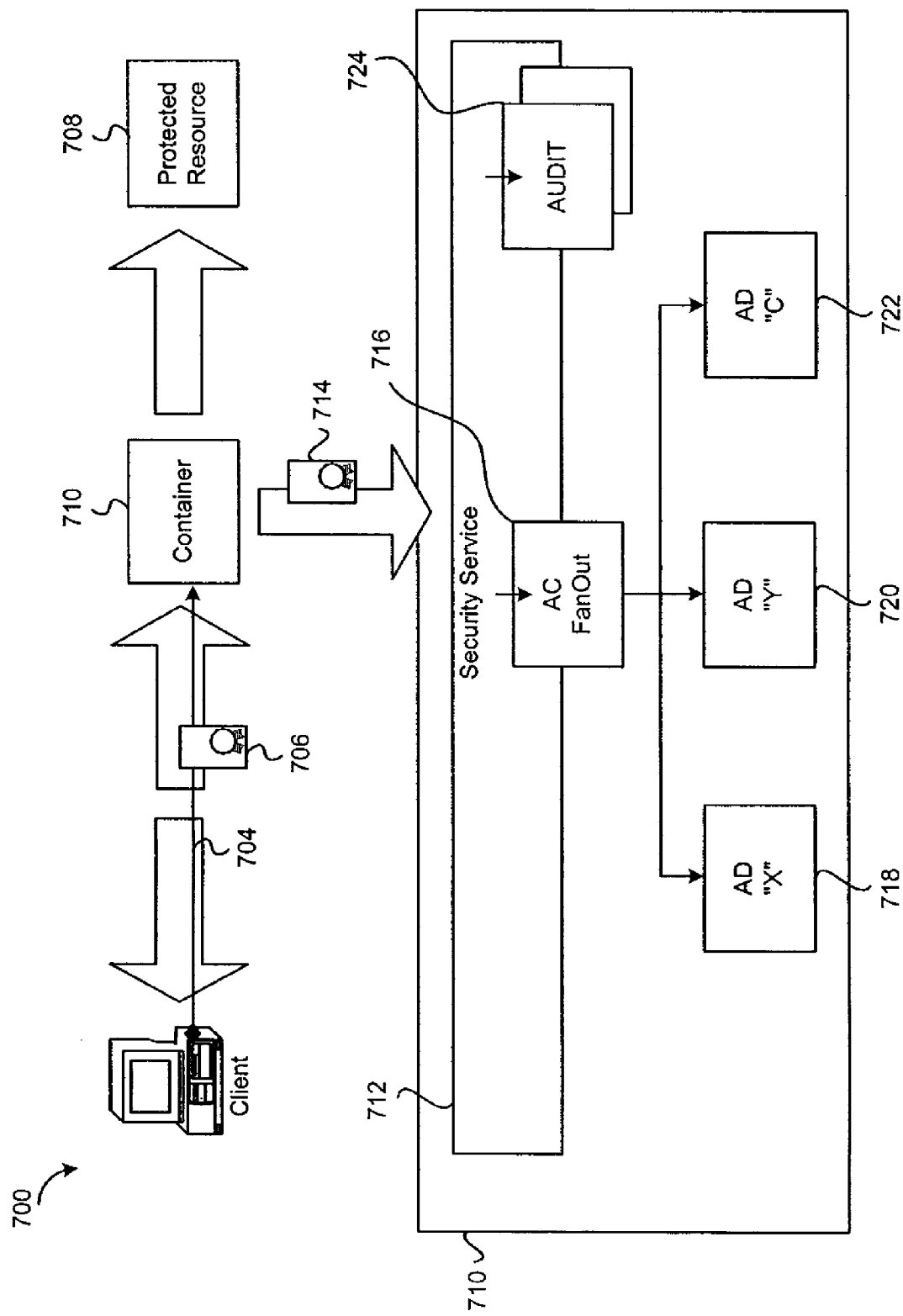
FIG. 7 shows an illustration of a security service and a protected resource in accordance with the invention.

FIG. 7 illustrates an example of a client using the security server in accordance with the invention to access a protected resource on the network or the server. The process starts with the client 702 making a request, which is one instance may be a simple case of the client authenticating itself. The client makes a connection to the container, indicated by the arrow 704. A token 706 is passed along with the request. As a part of making the connection, the system (including the security server 710) makes a determination that the resource 708 is protected, so the client needs to authenticate. In this example, tokens represent the authenticated users of the client that are in turn being passed along in the invocation request to the container that the container will then use in the later step of calling the security service. In some embodiments the token represents the authenticated identity of the client itself. The client poses to the security service 712 (the same security service or security service 314) the question 714, "Can the user identified by this token get access and perform the requested capabilities on the target resource?"

To answer this question the security service uses an Access Controller, indicated as AC 716 in FIG. 7. The AC 716 does two things: it acts as a fanout spreading out through a series of Access Decision (AD) plug-ins 718, 720, 722, and it also acts as an adjudicator. When the AC calls the Access Decision it passes the token along to each Access Decision in turn, beginning with the first one, Access Decision 718, asking, "is this OK?" The Access Decision returns one of three responses: permit, deny, or abstain. The Access Controller then moves on to the next one if there is a next one, and so on until all Access Decisions have been polled. In effect the security mechanism acts like a series of panes of glass. If X 718 says "permit" the process continues on; if X 718 says "deny" the process stops. The AC then moves to Access Decision Y 720 and asks the exact same question presenting the exact same identity, and Y 720 similarly responds with a permit, deny or abstain.

This process continues for however many of these plug-ins the service has. An adjudication policy determines that if anyone says deny, then the process terminates, or simply returns an overall deny. The architecture allows for the adjudication policies which make this decision to be flexible enough that if X 718 is permit, and Y 720 is deny, and C 722 is abstain, then that can be considered a permit. Other implementations can take a more hard line: if there's any denying, it's an overall denial. An abstain is returned whenever the AC asks the access decision a question that the access decision doesn't exclusively understand, and hence cannot make an explicit decision. This is most common whenever a legacy authorization system is included that is needed for some but not all operations, or when X 718 is corporate policy, and Y 720 is line of business. In this case there may be questions asked that are enforced by corporate policy but not line of business, so the line of business decision maker says, "I don't understand this, I abstain."

When all of the access decision makers are polled and no one up to the point where the request finally gets through says deny, then the access request may reach a point that nobody denies, some permit and some abstain, for example, where Y 720 abstains and X 718 and C 722 both permit. The adjudication policy can be then used to control how to determine the outcome. In one embodiment there are only two outcomes to the container: a permit or a deny. So the access controller looks at the adjudication policy to determine how that decision is made. For example in some, out of the box implementations, the system may use an adjudication policy which says, "do I require unanimous permission?" In which case, X, Y and C all have to permit. If any one of them does not permit, then the outcome is a deny. The other approach is to not require unanimous consent, in which case as long as no one denies then the access is allowed to occur. This decision is made based on the adjudication policy.

No matter what happens within the access decision process the security service itself passes requests to the auditing subsystem 724 requesting that it audit what has just occurred and the outcome. Only at that point will the security service then tell the container that the final result is a permit or a deny. If it is permit, the container then allows the requested operation to be dispatched on to the protected resource. If it says deny, the request does not get to that point, and is immediately rejected.

The invention also provides a method to call the Access Decision process on the way out i.e., following a successful receipt of an access request at the protected resource. In this scenario it can be assumed the system went through the first checks on the request and everything was permitted, so the method was dispatched to the resource. The resource returns data that is intended to go out back to the client. Rather than just blindly returning this data back, the authorization check is rerun, this time allowing the security service, particularly the Access Decisions to look at the data to be returned to determine if its okay to return to the client. An example here is that of a business operation where a user is trying to request documents. When the user first enters they have a security clearance assigned to them, which means that they can look at documents that aren't classified above their security clearance. If they only have a secret security clearance and the documents that were to be returned have top secret, then even though they got the method to run, the system would not want to allow the outcome to go back to the user because they would then be allowed to see something that they are not permitted to see. The Access Decisions are re-run again, this time reviewing the output that's going to go back to the user and make that same kind of decision. In this example there may be a lot of abstains, for example the Y Access Decision 720 says, "I don't care what the output is going back, I only care about the input coming in." The developer can mix and match plug-ins to achieve different policies based on line of business, or based on corporate policy.

Figure 8:
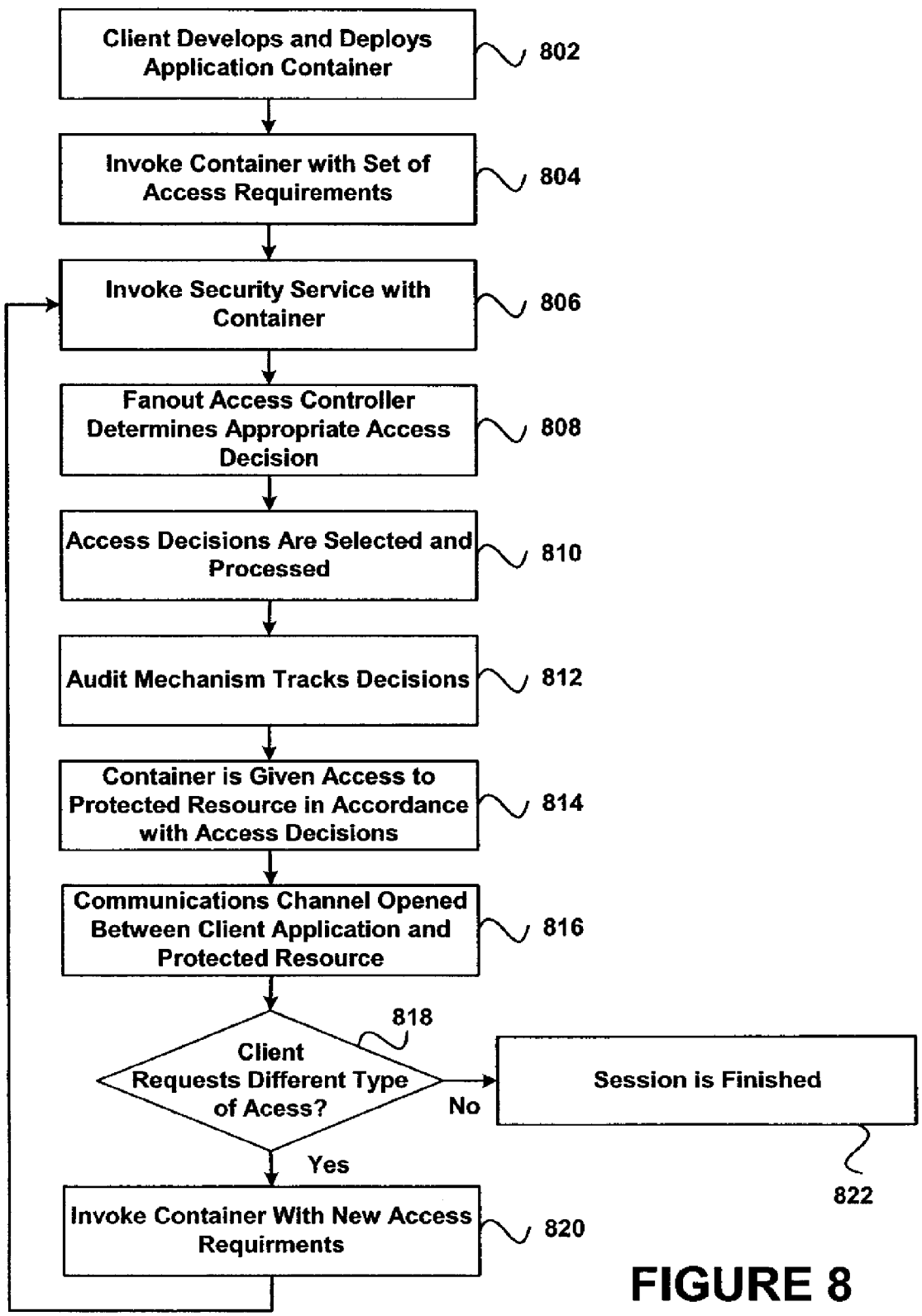
FIG. 8 shows a flowchart of a method used by the security service to allow access to a protected resource in accordance with the invention.

FIG. 8 illustrates a flowchart showing the process used by an embodiment of the invention in providing access to a secured or protected resource. In step 802, the client develops and deploys the application within a container. When the application requires access to the protected resource, a call is made and forwarded to the appropriate container shown by step 804. The container is used to invoke the security service in step 806. Within the security service, in step 808, a fanout access controller determines which access decisions are to take place in verifying or acknowledging this particular access request. In step 810 each Access Decision is selected, and processed or polled to determine its contribution to the access request, the output of each access decision being a deny, permit, or abstain. An audit mechanism tracks the outcome of each Access Decision in step 812. Based on the outcome of the access decision and the cumulative response—be it permit, deny, or abstain—in step 814 the container is given (or denied) access to the protected resource. In step 816 data can then be passed from the client application to the protected resource and vice versa. If the client later requests either to the same resource or a different resource (as determined in step 818), then the request is forwarded to the appropriate container and another authorization decision is required (step 820), otherwise the session terminates (step 822).

Figure 9:
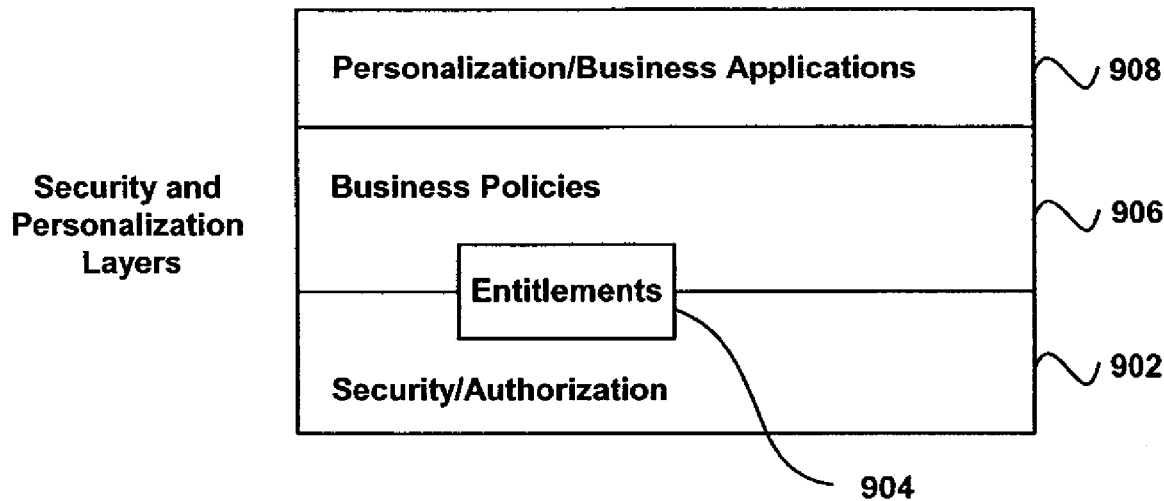
FIG. 9 shows an illustration of a security layer in accordance with an embodiment of the invention.

FIG. 9 illustrates the security and personalization layers in accordance with one embodiment of the invention, including the entitlements layer 904, and its positioning in relation to the business application layer 908, business policies layer 906 and security authorization layer 902. It will be evident to one skilled in the art that the illustration shown in FIG. 9 is an abstract representation of how an entitlements layer may be developed, but that many other variations on this architecture can be used, and that such discrete layers might not (and in fact most likely would not) be used in any particular design implementation. FIG. 9 shows how entitlements 904 can be used to transcend the boundary between the traditional security architecture (represented as 902), and the often-distinct business policy architecture (represented as 906). The information garnished through the use of such entitlements is used to direct the operation of a company's business applications represented as 908, including personalizing them for individual entities based on that entity's entitlement.

Figure 10:
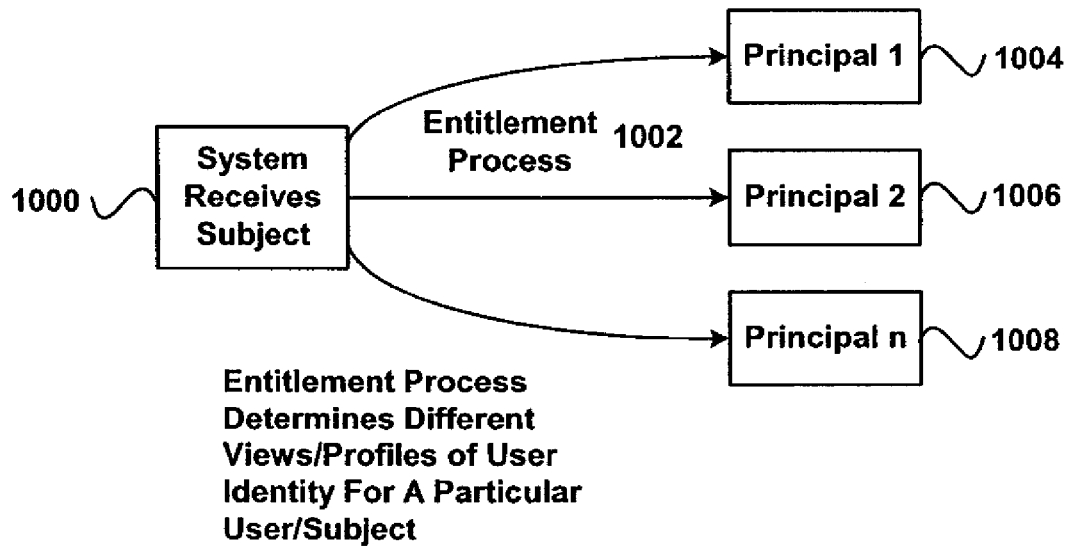
FIG. 10 shows an illustration of an entitlement mechanism in accordance with an embodiment of the invention.

FIG. 10 shows how entitlements can be used to generate roles dynamically. An entitlement process 1002 allows a security question to be asked within a context. The invention includes an ability to dynamically assign roles to a particular subject 1000, for example Principal 1 1004, Principal 2 1006, through Principal n 1008, based on that entitlement, which further allows the system to provide an application context within the security layer, and allows authorization questions to be phrased in terms of the application. The system can only accurately answer those questions if they are presented in terms of the context, like the common example of a doctor and a patient. If the question is posed "Can Dr. Smith modify a patient's chart?", then it is a context-less question. The traditional answer is "sometimes yes and sometimes no." The only way to properly determine the answer is to know the context in which the question is asked, i.e., which patient are we talking about, and perhaps which chart. The system can then make role assignments like ownership or basically dynamic assignments that allow the system to make business decisions rather than security decisions.

Using a simple notation we can represent the concept as follows: For each subject, an active role AR is one that the subject is currently using:

AR(s:subject)={active role for subject s}

Each subject may be associated with one or more authorized roles RA:

RA(s:subject)={authorized roles for subject s}

Each role may be authorized to perform one or more tasks TA:

TA(r:role)={tasks authorized for role r}

Subjects may execute tasks if the predicate function exec(s,t) is true at the current point in time with the current values:

exec(s:subject,t:task)=true if subject s can execute task t

In order for the above statements to evaluate correctly, a couple of rules are required:

1. Role assignment—a subject can execute a transaction only if the subject has been assigned a role. The identification and authentication process are not considered part of the task, whereas all other activities performed on the system are conducted through tasks:

$\forall$s:subject,t:task(exec(s,t)AR(s)$\rightarrow$$\neq$0)

2. Role authorization—a subject's active role must be authorized for the subject. This rule ensures that users can only take on roles for which they are authorized:

$\forall$s:subject (AR(s)$\subseteq$RA(s))

3. Task authorization—a subject can execute a task only if the task is authorized for the subject's active role:

$\forall$s:subject,t:task(exec(s,t)$\rightarrow$t$\in$TA(AR(s)))

As another example, a developer can use the invention to personalize Web pages based on what a user is entitled to do. For example, a self-registration or self-help feature can be made a part of a credit card website where, the user is the only one that can change their credit card numbers. Vendors can read them but they can't change them, and nobody else can see them. The system cannot figure out how to do this unless it knows the context. Can someone modify the credit card field? Of course someone can modify the credit card field. So, now, who can modify it? This is part of the context. Then the system must ask which particular one, because it can't just let any member modify any other member's credit card. So the system must know which object is under consideration, and which profile so it can then ask, "are you the owner of that profile?" In the past the only thing defined were static roles. What the invention does through the use of entitlement is allow, business analysts and business policy makers to define dynamic roles which are computed at run time in order to define to the object or the principal identity. These roles do not violate the security specification of the underlying server architecture. For example, a request may be a caller enrolled for the owner role. The system does not define the owner role, but it can have it dynamically associated to the user and then revoked from the user, as soon as they try to do something that they aren't the owner of anymore. Methodologies such as EJB can take advantage of this in that should the use be allowed to do something is based on whether or not you're in that role and you use the standard EJB to query that capability.

Figure 11:
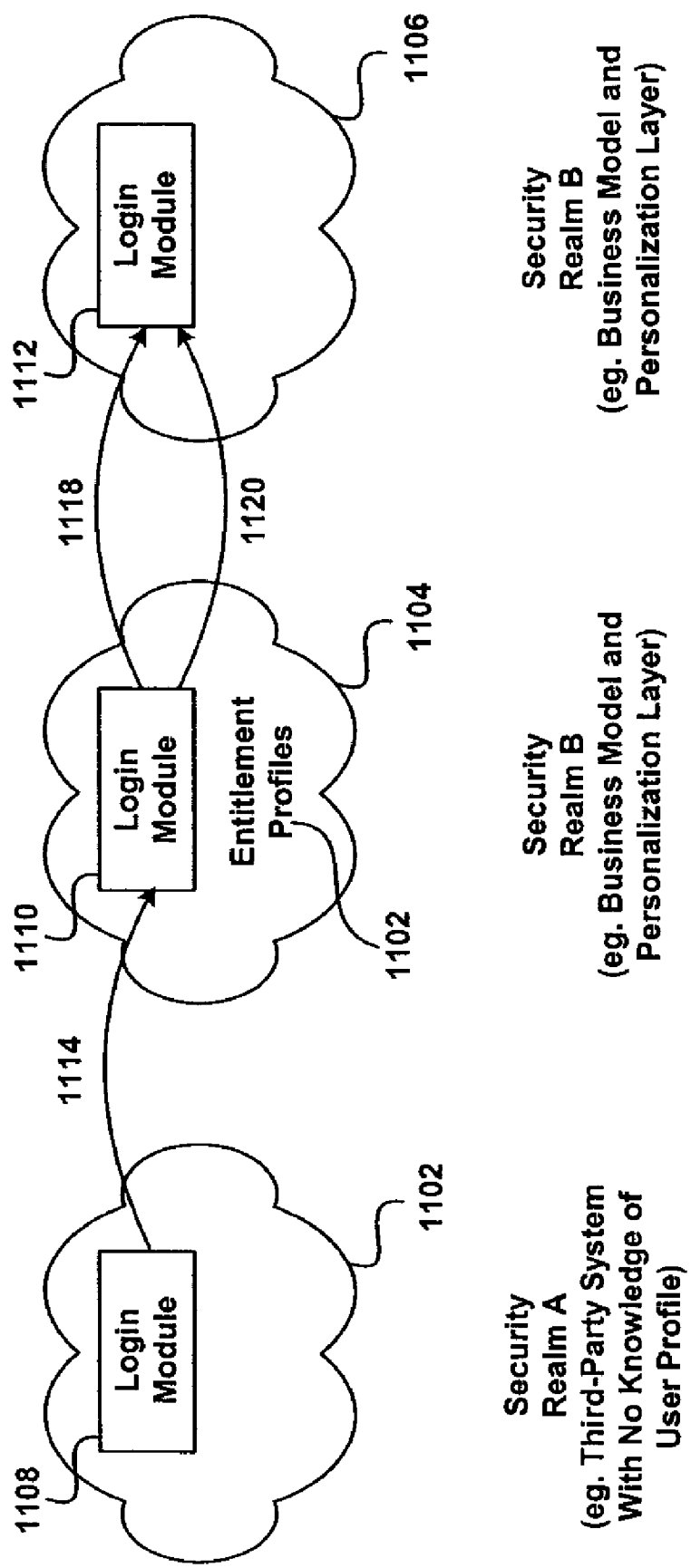
FIG. 11 shows an illustration of a login across several security domain models in accordance with the invention.

Another example of how the invention may be used is through the provision of a single sign-on mechanism, which may combine elements of a traditional security implementation with elements of a business policy implementation. As shown in FIG. 11, information received during an initial login process at a first security realm A 1102, for example a security realm which is provided by a third-party application and has no knowledge of a user's profile, or of a corporation's business policies, can be captured by a first login module 1108, and passed (indicated by the arrow 1114) to a second login module 1110 in a second security realm 1104. The second security realm B 1104 may have a knowledge of the business policies, and can determine or calculate entitlements or entitlement profiles 1102 for a user in addition to the original login information. The original login information, and the entitlement information (indicated by arrows 1118 and 1120 respectively) may be passed to a third login module 1112 in a third security realm C 1106, and so on.

Security Provider Interfaces

Security Provider Interfaces (SPI) that can be used with the invention include interfaces for:

Authentication—Java Authentication and Authorization Service (JAAS) LoginModule
Authorization—AccessDecision
Auditing—AuditChannel
Principal Mapping→Role Mapping—JAAS LoginModule
Principal→Credentials Mapping—JAAS LoginModule
Key Storage—Java 2 KeyStoreSpi
Certificate Retrieval and Revocation—CertPath
Certificate Mapping—CertAuthenticator
Hardware Accelerators—Java Cryptographic Extensions
Perimeter Protection—ConnectionFilter It will be evident to one skilled in the art that the SPI's described herein are merely examples of the type of interface that can be used with the invention, and are listed here for purposes of illustrating the flexibility of the security service architecture provided by the invention. Other types of interface can be used to replace or augment those described, while remaining within the spirit and scope of the invention.

Authentication SPI

The JAAS Login Module used by the invention is based on the standard JAAS LoginModule, but additionally supports standard Login Module implementations. The authentication SPI is extended to support management of users, groups, and to provide support for multiple JAAS Login Modules. Credentials can be shared across Login Module instances, and a separate Login Module to update with user profile information can be provided. The responsibilities of the Authentication SPI include authentication of users based on security realm scope, and the population of the principal in the JAAS Subject.

Authorization SPI

The Authorization SPI provides for Access Decision, for which there is no Java equivalent sufficient. The Authorization SPI supports a variety of authorization models, both declarative and rules based. A callback handler can be used to obtain access to invocation context. The SPI also provides access to subject information, including principal identities, group membership and role assignments, and user profile information (optional). Multiple Access Decision providers can be configured in stack. The responsibilities of the Authorization SPI include making authorization decision of permit, deny, or abstain, or access requests for protected resources scoped by application. FIG. 11 illustrates an example of how the invention can be used to distribute profile information between security realms within a domain.

Auditing SPI

The Auditing SPI includes an Audit Channel, for which no Java equivalent is defined. A callback handler is used to obtain access to invocation context including access to subject information, principal identities, group membership and role assignments, and user profile information (optional). Again, Multiple Audit Channel providers can be configured in stack. The responsibilities of the auditing SPI include determining if information should be audited, and performing the actual audit of the data based on QoS policies.

Principal→Role Mapping SPI

The Principal→Role Mapping (JAAS LoginModule) SPI is based on the JAAS Login Module, and is used to dynamically map roles to the identities of the principals contained in the Subject. The roles may have been explicitly defined by an administrator or from a deployment descriptor, or they may be dynamically computed based on the parameters of the business request, the value of attributes in a principal's profile, as well as other conditions.

Principal→Credential Mapping SPI

The Principal→Credential Mapping (JAAS LoginModule) SPI is based on the JAAS Login Module, and is used to map principal identity when cross security domain policy or technology boundaries. The responsibilities of the Principal Mapping SPI is based on the Subject provided, and can be used to add public credentials with appropriate information to subject, such as password credential for username/password, and generic credential for token-type credentials.

Key Storage SPI

The Java 2 KeyStore SPI is based on the Java 2 KeyStore interface, and provides consistent access to keys stored in a variety of medias, including File-based: (PKCS #5/#8, PKCS #12), HSM-based: (PKCS #11), Smart Card/Java Card. The Key Storage SPI provides necessary support for code signing, and its responsibilities include retrieval of private key from protected storage, and retrieval of secrets from protected storage.

Certificate Retrieval SPI

The Certificate Retrieval SPI (CertPath) is based on JSR 55, and provides consistent mechanism to retrieve, verify, and revoke digital certificates, in addition to support for multiple certificate types. The responsibilities of the CertPath SPI include: CertStore: retrieval of certificates from store via query; CertPath: retrieval of chain of certificates utilizing CertStore; CertPathChecker: validates a certificate; and CertPathValidator: validate a chain of certificates.

Certificate Mapping SPI

The Certificate Mapping SPI (CertAuthenticator) for which no Java equivalent defined, provides an extensible means to allow mapping between digital certificates and principal identity within a security domain. It further provides verification and revocation checks performed prior to calling of CertAuthenticator. The responsibilities of the certificate mapping SPI are based on a verified client's digital certificate, map to username and realm of principal.

Hardware Accelerator SPI

The Hardware Accelerator SPI uses Java Cryptographic Extensions, and is based on Java 2 security architecture. The responsibilities include providing cryptographic services under control of the security service.

Perimeter Protection SPI

The Perimeter Protection SPI includes a Connection Filter to provide a built-in connection filter implementation. It is focused on ease of use, and is configurable from the console via Mbeans, allows continued support for user-written filters, and for cascading filters, each executed in turn. This minimizes conditions customers must handle.

Security Management SPI

The Security Management SPI Integrate third-party vendors consoles into the server console and allows security to redirect to servlets from these vendors. The security management SPI provides support for the full lifecycle of users, groups, roles, and authorization info.

Single Sign-On (SSO) SPI

The Single Sign-on SPI uses LoginModule to map from the initiating principal's identity to resources identity, and to provide secure storage of resource credentials.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A system, comprising:
   a computer including a computer readable medium and processor operating thereon;
   a security service that makes decisions to permit or deny access requests;
   an application container that receives an access request for a protected resource from a client and delegates authorization decisions to the security service by passing the access request, and
   a callback handler to the security service; and
   a plurality of security plug-ins at the security service that use the callback handler to request context information from the application container describing the access request;
   wherein the system dynamically associates one or more roles with the client, for the purposes of the access request, at runtime based on the context information, before an authorization decision for the protected resource is determined by the security service;
   wherein each of the plurality of security plug-ins determines an access decision based on the context information; and
   wherein the security service then
      determines entitlements for the client to use with the protected resource based on the access decisions from the plurality of security plug-ins, and
      uses the one or more roles associated with that client for the purposes of that access request to make the authorization decision.

2. The system of claim 1 wherein the security service further includes an access controller for transferring the access request to the plurality of security plug-ins, and for combining the access decisions into an overall decision by the security service to permit or deny the access request.

3. The system of claim 1 wherein one or more of the plurality of the security plug-ins represent a business function related authorization policy.

4. The system of claim 1 wherein a deny or abstain by any one of the plurality of security plug-ins causes the security service to deny the access request.

5. The system of claim 1 wherein an abstain by any one of the plurality of security plug-ins does not cause the security service to deny the access request.

6. The system of claim 1, wherein computation of a role occurs immediately before an authorization decision for the protected resource.

7. A method, comprising:
   receiving at an application container an access request from a client to access a protected resource;
   communicating the access request from the application container to a security service with the access request and a callback handler, wherein a plurality of security plug-ins are plugged into the security service;
   using the callback handler at each of the plurality of security plug-ins to request context information from the application container for the access request;

dynamically associating one or more roles with the client, for the purposes of the access request, at runtime based on the context information before an authorization decision for the protected resource is determined by the security service;

determining entitlements for the client to use with the protected resource depending on output from each of the plurality of security plug-ins;

determining an access decision by each of the plurality of security plug-ins based on the context information;

making the authorization decision, using the one or more roles associated with that client for the purposes of that access request, at the security service to permit or deny the access request; and if the authorization decision is to permit the access request, then communicating a permitted access request to the protected resource.

8. The method of claim 7 wherein one or more of the plurality of the security plug-ins represent a business function related access policy.

9. The method of claim 7 wherein a deny or abstain by any one of the plurality of security plug-ins causes the security service to deny the access request.

10. The method of claim 7 wherein an abstain by any one of the plurality of security plug-ins does not cause the security service to deny the access request.

11. The method of claim 7, wherein computation of a role occurs immediately before an authorization decision for the protected resource.

12. A non-transitory computer readable storage medium storing instructions, the instructions causing a computer to perform a method of:

receiving at an application container an access request from a client to access a protected resource;

communicating the access request from the application container to a security service with the access request and a callback handler, wherein a plurality of security plug-ins are plugged into the security service;

using the callback handler at each of the plurality of security plug-ins to request context information from the application container for the access request;

dynamically associating one or more roles with the client, for the purposes of the access request, at runtime based on the context information before an authorization decision for the protected resource is determined by the security service;

determining entitlements for the client to use with the protected resource depending on output from each of the plurality of security plug-ins;

determining an access decision by each of the plurality of security plug-ins based on the context information;

making the authorization decision, using the one or more roles associated with that client for the purposes of that access request, at the security service to permit or deny the access request; and if the authorization decision is to permit the access request, then communicating a permitted access request to the protected resource.

13. The non-transitory computer readable storage medium of claim 12 wherein one or more of the plurality of the security plug-ins represent a business function related access policy.

14. The non-transitory computer readable storage medium of claim 12 wherein a deny or abstain by any one of the plurality of security plug-ins causes the security service to deny the access request.

15. The non-transitory computer readable storage medium of claim 12 wherein an abstain by any one of the plurality of security plug-ins does not cause the security service to deny the access request.

16. The non-transitory computer readable storage medium of claim 12, wherein computation of a role occurs immediately before an authorization decision for the protected resource.

* * * * *

UNITED STATES PATENT AND TRADEMARK OFFICE
CERTIFICATE OF CORRECTION

| | | |
|---|---|---|
| PATENT NO. | : 7,823,189 B2 | Page 1 of 1 |
| APPLICATION NO. | : 12/142451 | |
| DATED | : October 26, 2010 | |
| INVENTOR(S) | : Paul B. Patrick | |

It is certified that error appears in the above-identified patent and that said Letters Patent is hereby corrected as shown below:

On the first page, in field (57), in column 2, in "Abstract", line 2, delete "plugins" and insert -- plug-ins --, therefor.

On sheet 6 of 10, in Figure 6, Box No. 604, line 1, delete "toContainer" and insert -- to Container --, therefor.

In column 3, line 59, delete "plugins" and insert -- plug-ins --, therefor.

In column 5, line 25, delete "plugins" and insert -- plug-ins --, therefor.

In column 6, line 28, after "behalf" insert -- . --.

In column 8, line 61, delete "itself For" and insert -- itself. For --, therefor.

In column 12, line 40, after "resource?"" insert -- . --.

Signed and Sealed this

Second Day of August, 2011

David J. Kappos
*Director of the United States Patent and Trademark Office*